United States Patent
Bihlet

(10) Patent No.: US 11,179,755 B2
(45) Date of Patent: Nov. 23, 2021

(54) VENTILATION SYSTEM, A METHOD OF OPERATING A VENTILATION SYSTEM, A DUCT SECTION TO BE USED IN A VENTILATION SYSTEM, AND THE USE OF SUCH DUCT SECTION

(71) Applicant: Nederman Holding AB, Helsingborg (SE)

(72) Inventor: Klaus Bihlet, Randers (DK)

(73) Assignee: Nederman Holding AB, Helsingborg (SE)

( * ) Notice: Subject to any disclaimer, the term of this patent is extended or adjusted under 35 U.S.C. 154(b) by 144 days.

(21) Appl. No.: 16/280,355

(22) Filed: Feb. 20, 2019

(65) Prior Publication Data

US 2020/0061681 A1  Feb. 27, 2020

(30) Foreign Application Priority Data

Aug. 22, 2018 (EP) .................................... 18190266

(51) Int. Cl.
*B08B 15/00* (2006.01)

(52) U.S. Cl.
CPC .................................. *B08B 15/005* (2013.01)

(58) Field of Classification Search
CPC .................................................... B08B 15/005
USPC ......................................................... 454/49
See application file for complete search history.

(56) References Cited

U.S. PATENT DOCUMENTS

| | | |
|---|---|---|
| 5,886,267 A | 3/1999 | Ortiz |
| 9,657,958 B2 | 5/2017 | Litomisky |

FOREIGN PATENT DOCUMENTS

| | | | |
|---|---|---|---|
| EP | 0409779 | | 6/1997 |
| JP | 2012159484 A | * | 8/2012 |
| JP | 2011021365 | | 8/2013 |
| WO | WO 2015/013171 A1 | | 1/2015 |

OTHER PUBLICATIONS

Search Report entered in EP-18190266.9, dated Mar. 28, 2019, 7 pages.

* cited by examiner

*Primary Examiner* — Allen R Schult
(74) *Attorney, Agent, or Firm* — Vorys, Sater, Seymour & Pease

(57) ABSTRACT

A ventilation system is disclosed comprising a main duct (101) connected to at least one motorized fan (105), and further connected to at least one workplace (Wa; Wb; Wc) via a local duct arrangement (102*a*; 102*b*; 102*c*). The local duct arrangement comprises an asymmetrical bend duct section (106). A first and a second pressure sensor (120,122) are arranged on different positions on the outside of the bend duct section and in communication with the interior thereof. The pressure sensors are configured to communicate with a control computer (200) configured to determine a pressure difference between the positions of the sensors and to control the speed of the fan. Further, a method of operating a ventilation system is disclosed and also an asymmetric bend duct section and the use thereof.

9 Claims, 5 Drawing Sheets

VENTILATION SYSTEM, A METHOD OF OPERATING A VENTILATION SYSTEM, A DUCT SECTION TO BE USED IN A VENTILATION SYSTEM, AND THE USE OF SUCH DUCT SECTION

TECHNICAL FIELD

The present invention refers to a ventilation system, a method of operating a ventilation system, a duct section to be used in a ventilation system, and the use of such duct section.

TECHNICAL BACKGROUND

Industrial ventilation systems typically comprise a duct system comprising a main duct connected to at least one motorized fan, and a plurality of branching local ducts, each connected to a workplace. A gate is arranged in a suitable position along each and one of the local ducts to allow partial or full closing of the passages through the local ducts to thereby allow control of the air flow from the individual workplaces to the main duct. The motorized fan and the gates are typically controlled by at least one control computer which operates based on signals received from a plurality of sensors arranged in a number of positions along the duct system, such as along the local ducts adjacent the gates and/or the workplaces.

The air flowing through the duct system often contains particles and dust that is combustible and which may be flammable and explosive under certain conditions. The particles and dust is generated at the workplaces and is transported away therefrom by the air flow generated by the fan. To reduce the risk of the combustible particles and the dust settling along the interior of the duct system it is usually necessary to maintain minimum transport velocities for the materials at all times and in the ducts of the ventilation system to thereby prevent or lower the risk of combustion occurring in the ventilation system.

It is also complicated and time consuming to design, install and maintain a ventilation system. To ensure that the air velocity is above the recommended and relevant standards, air velocities are typically measured and recorded throughout the entire ventilation system during installation. However, installers and manufacturers often change their installation and manufacturing setup. Also users may change the set-up. Additionally, in many cases the set-up of the ventilation system is changed during the lifetime due to upgrades/changes of production machines, blockage of filters etc. Each change, although small has an impact on the overall performance of the ventilation system. An improperly operating ventilation system may also affect the energy consumption of the building due to heat losses if the air velocities become too high. Further, too high air velocities cause extra energy consumption of the motor(s) and fan(s) and also excessive wear to filter system components such as filter material. Further, in case of the dust being of abrasive nature, bends in the duct system may wear.

Further, it is a well-known truth that even though the ventilation system is calibrated upon installation it is in many cases not re-calibrated during its lifetime since the calibration is costly and time consuming and also affects and restricts the access to the working site. Since each obstruction in the duct system, including sensors, acts as a potential surface for settlement of particles, stationary sensors inside the ducts are avoided. Instead, the ordinary production is often temporarily shut down while the system is calibrated based on information received from probes, i.e. sensors that are temporarily inserted through the duct walls.

To target these problems, the market has introduced so called on-demand ventilation systems. An on-demand ventilation system uses a control computer which operates based on signals from a plurality of sensors. The control computer is configured to automatically set the gates and variable frequency drives to thereby adjust the performance of the ventilation system. One such solution is disclosed in U.S. Pat. No. 9,657,958. This document describes a system and a method for closed-loop regulation of a ventilation system using a control computer. The control computer is configured to operate based on signals received from one or more air pressure sensors that are placed on a side of the at least one duct such that an air pressure is measured as the air is drawn through the at least one duct, whereby a plurality of air pressure measurements are generated. The one or more air pressure sensors are configured to be flush with an interior side of the at least one duct to thereby not unduly obstruct the air as the air is drawn through the at least one duct. Accordingly, also this system and method relies on the problem of sensors being arranged close to the interior of the duct system, thereby forming obstructions onto which particles may settle and also the risk of the sensors being influenced by particles in the air stream.

There is accordingly a need for a measurement system that does not require sensors inside the ducts or close to the interior of the ducts, and which system allows a simple installation, no matter if the installation is made together with overall installation of the ventilation system or if it is installed as a retro-fit.

SUMMARY

One object of the invention is to provide a control system that allows an on-demand, closed-loop regulation of a ventilation system that has no components that are arranged inside or close to the interior of the ducts, thereby avoiding formation of any obstructions that may allow settlement of dust/particulate matter within the ducts and also avoiding that the performance of the sensors is negatively influenced by particles in the air stream.

Another object is to provide a control system that allows a simple installation, no matter if the installation is made during installation of the ventilation system, or as a retro-fit in an already installed system.

Yet another object is to provide a control system that automatically provides numerous sampling of measurements that may be used to determine and control the air velocity inside a local duct portion in the proximity to an individual workplace and which control system uses this information to control the operation of the complete ventilation system to thereby maintain a minimum air flow in the local duct arrangements of the ventilation system.

It is another object of the invention to provide a system and a method of measuring, calculating and controlling the air velocity in the proximity of each workplace during continuous operation of the ventilation system.

These and other objects are solved by a ventilation system comprising a main duct connected to at least one motorized fan, and further connected to at least one workplace via a local duct arrangement, wherein said local duct arrangement comprises an asymmetrical bend duct section having a straight duct portion connected to a bend duct portion and a gate arranged in a position between the workplace and the main duct, and a control computer;

said asymmetrical bend duct section being defined by a circumferential wall portion forming as seen along the longitudinal extension of the asymmetrical bend duct section a first duct opening facing the workplace and a second duct opening facing the main duct;

said ventilation system further comprising a first pressure sensor arranged on the outside of the asymmetrical bend duct section and in fluid communication with the interior of the asymmetrical bend duct section via a first through-going opening arranged in the circumferential wall portion of the straight duct portion; and a second pressure sensor arranged on the outside of the asymmetrical bend duct section and in fluid communication with the interior of the asymmetrical bend duct section via a second through-going opening arranged in the circumferential wall portion of the bend duct portion or in a duct section connected to the bend duct portion;

wherein said first and second pressure sensors are configured to communicate with the control computer;

wherein said control computer is configured to determine, based on input signals from the first and second pressure sensors, a pressure difference between the positions of the through-going openings of the first and second pressure sensors; and wherein said control computer is further configured to control the speed of the motorized fan based on the determined pressure difference.

By the invention, a ventilation system is provided that operates based on determination of a pressure difference in each local duct arrangement where the pressure difference is used by a control computer as input to control the speed of the motorized fan. More precisely, the control computer uses the determined pressure difference as an input value when calculating the air velocity inside the local duct arrangement. The pressure difference inside each local duct arrangement is determined based on signals from sensors that are arranged on the outside of each local duct arrangement while being in fluid communication with the interior of the local duct arrangement. More precisely, the pressure difference is determined between the positions of the through-going openings. By physically arranging the sensors on the outside of the local duct arrangements, a number of advantages are provided. First of all, there are no sensors inside or close to the interior of the duct system that may obstruct or otherwise influence the air flow inside the ducts. Accordingly, there are no sensors inside or close to the interior of the duct system onto which particulate matter in the air stream may settle. Also, the performance of the sensors will not be influenced by any particulate matter in the air stream. Further, the asymmetrical bend duct section supporting the sensors may be provided as an off-the-shelf duct unit that easily may be mounted in a ventilation system during installation or be retro-fitted in an already installed ventilation system. The asymmetrical bend duct section may be arranged in any position between the main duct and the workplace. In a typical ventilation system, the main duct extends along the ceiling and is connected to each workplace via vertical drop ducts which connect to the main duct via bend ducts. The asymmetrical bend duct section may by way of example replace such bend duct. The communication between the pressure sensors and the control computer may be made via various types of wired field bus industrial protocols or industrial wireless protocols.

The pre-determined acceptable air velocity is typically prescribed by guidelines or government regulations and in some cases by contracts with the customer. Accordingly, the pre-determined acceptable air velocity for each local duct arrangement is a known value and may be handled as a pre-programmed rule by the control computer. This greatly simplifies the otherwise complex and time consuming commissioning of the ventilation system during installation, i.e. the process by which an equipment, facility or plant is tested to verify if it functions according to its design objectives or specifications. This also means that separate pressure measurements using probes that are temporarily inserted to the ducts are no longer required during commissioning. This simplifies the commissioning and remove error possibilities.

The sampling frequency, i.e. the time between each pressure measurement may be altered depending on how the ventilation system is used. The sampling frequency may by way of example be higher during normal working hours in the building or if certain workplaces requiring a higher air flow are running or not. The sampling frequency may also be increased during commissioning.

The ventilation system may be an exhaust ventilation system, i.e. a system extracting air from the site, or an inlet ventilation system providing an air flow to the site.

In the context of the invention, the term "asymmetrical" should be understood as a bend duct section where the two free ends (arms) of the bend duct section have different longitudinal extensions. In its simplest form, the asymmetrical bend duct section may comprise a bend duct portion having an angle α of 90 degrees with two arms of equal lengths L1 and where one of the arms is connected to or merges with a straight duct portion having a length L2, thereby forming an asymmetrical bend duct section with different arm lengths L1 and L1+L2 respectively. It is to be understood that that the bend duct portion as such may form an angle α different to 90 degrees.

The bend duct portion may have a bend extending along an angle α in view of a first virtual plane A extending through the center of curvature CC of the bend duct portion and perpendicular to a longitudinal center line CL of the asymmetrical bend duct section; and wherein the second through-going opening is arranged in the circumferential wall portion of the bend duct portion or in the duct section connected to the bend duct portion along a second virtual plane B extending through the center of curvature CC of the bend duct portion and forming an angle β relative to the first virtual plane A, the angle β extending in a virtual center plane C in parallel with the longitudinal center line CL, and wherein the angle β is within the range of +/−⅔ of the angle α and more preferred within the range of +/−½ of the angle α.

Accordingly, the second through-going opening is arranged in or adjacent the downstream end of the asymmetrical bend duct section. The second through-going opening may either be arranged in the bend duct portion of the asymmetric bend duct section or in a duct section connected to the bend duct portion of the asymmetric bend duct section. Thereby the second pressure sensor which is arranged to communicate with the interior of the asymmetric bend duct section through the second through-going opening will be able to measure the pressure in the turbulent air flow, which turbulence is the result of the air flow changing flow direction when going from the straight duct portion to and through/past the duct bend.

The control computer may be configured to calculate the present air velocity inside the local duct arrangement based on the determined pressure difference; compare the calculated present air velocity with a pre-determined acceptable air velocity inside the local duct arrangement; and if the calculated present air velocity is determined to differ from the pre-determined acceptable air velocity, adjust the speed of the motorized fan.

The ventilation system may comprise at least two workplaces with related local duct arrangements, wherein the control computer is configured to determine which local duct arrangement exhibits the calculated present air velocity that differs the most from the pre-determined acceptable air velocity, and to adjust the speed of the motorized fan to a condition where the difference is approximately zero for at least one of the local duct arrangements and where the other local duct arrangement(s) exhibits an air velocity above or equal to the pre-determined acceptable air velocity.

Accordingly, the ventilation system may be seen as a system that strives towards a situation where all local duct arrangements with their related workplaces meets the set requirements regarding a minimum acceptable air velocity. The ventilation system will automatically compensate for changes in the kind of work being performed at individual workplaces, hose bend changes, clogging of filters, and wanted or unwanted changes, such as a hole in a hose. Traditional methods finding a pre-determined static vacuum at installation commissioning does not compensate for such changes. Further, a ventilation system is provided that strives to optimize the air velocities to meet minimum acceptable velocities while still not being excessively too high. Too high air velocities do not only cause heat losses in the building, but do also cause extra energy consumption of the fan(s) and also excessive wear to filter system components such as filter material. Further, in case of the dust being of abrasive nature, bends in the duct system may wear.

The control computer may further be configured to control opening and closing of the gate. This may by way of example be useful if there is no work going on at a specific workplace whereby its related gate may be closed. A full or partial closure of an individual gate may then save energy by reducing the leakage of heating from the building.

The first and second pressure sensors may be arranged in fluid communication with the interior of the duct section via connectors or distance members.

Accordingly, the first and the second pressure sensors may be arranged in fluid communication with the interior of the asymmetric bend duct section via a distance member formed by a pipe or flexible tube that extends between the first through-going opening and the first pressure sensor and between the second through-going opening and the second pressure sensor respectively. The use of a distance member allows an arbitrary positioning of the sensors and thereby a facilitated access. The first and second pressure sensors may alternatively be arranged by a respective connector directly to the exterior wall portion of the asymmetrical bend duct section.

Even though the pressure sensors are arranged on the outside of the asymmetrical bend duct section and on distance from its exterior wall, the same pressure will prevail at the position of the pressure sensor and its measuring point as inside the asymmetrical bend duct section. The first and the second through-going openings may be arranged along the inner curvature of the asymmetrical bend duct section, i.e. where the radius R as seen in a virtual plane C in parallel with the longitudinal center line of the asymmetrical bend duct section is the smallest. The risk of dust reaching the pressure sensors is thereby minimized since the dust that is transported through the asymmetrical bend duct section will strive to follow the opposite wall portion having the largest radius due to centrifugal forces. Further, some of the practical pressure measured by the first and the second pressure sensors is the result of the turbulence close to the internal side of the bend since the air tends to move straight forward.

The ventilation system may comprise at least two local duct arrangements, each connecting a workplace to the main duct, and wherein the at least two local duct arrangements comprises asymmetrical bend duct sections having different diameters. Different workplaces may require different duct diameters depending on intended use and required airflow.

The asymmetrical bend duct section with it's respective first and second pressure sensors may be provided as one installation unit. Thus, the asymmetrical bend duct section supporting the sensors may be provided as an off-the-shelf duct unit that easily may be mounted in a ventilation system during installation or be retro-fit in an already installed ventilation system. The asymmetrical bend duct section may be arranged in any position between the main duct and the workplace. In a typical ventilation system, the main duct extends along the ceiling and is connected to each workplace via vertical drop ducts which connect to the main duct via bend ducts. The asymmetrical bend duct section may by way of example replace such bend duct.

The communication between the pressure sensors and the control computer may be configured to be made via various types of wired field bus industrial protocols or industrial wireless protocols.

According to another aspect, a method of operating a ventilation system according to any of claims 1-8 is provided, said ventilation system comprising at least a first and a second workplace with related local duct arrangements. The method comprises, by using the control computer, the acts of:

determining, based on input signals from the first and second pressure sensors, the pressure difference between the positions of the through-going openings of the first and second pressure sensors in the first local duct arrangement;

determining based on input signals from the first and second pressure sensors, the pressure difference between the positions of the through-going openings of the first and second pressure sensors in the second local duct arrangement;

calculating the present air velocities inside the first and the second local duct arrangements based on the determined pressure differences;

determining any differences between the calculated present air velocities inside the first and the second local duct arrangements with pre-determined acceptable air velocities for each of the first and second local duct arrangements; and if a difference is determined:

determining which local duct arrangement exhibits the calculated present air velocity that differs the most from the pre-determined acceptable air velocity; and adjusting the speed of the motorized fan to a condition where the difference is approximately zero for at least one of the local duct arrangements and where the other local duct arrangement(s) exhibits an air velocity above or equal to the pre-determined acceptable air velocity.

Accordingly, the method uses a closed loop regulation which constantly strives to meet the airflow requirements for each local duct arrangement with its respective workplace. The pre-determined acceptable air velocity is typically prescribed by guidelines or government regulations and in some cases by contracts with the customer. Accordingly, the pre-determined acceptable air velocity for each local duct arrangement is a known value and may be handled as a pre-programmed rule by the control computer. This greatly simplifies the otherwise complex and time consuming commissioning of the ventilation system during installation, i.e.

the process by which an equipment, facility or plant is tested to verify if it functions according to its design objectives or specifications. This also means that separate pressure measurements using probes inside the ducts are no longer required during commissioning. This simplifies the commissioning and remove error possibilities.

Further, by said method, a control system is provided that automatically provides numerous sampling of measurements that may be used to determine and control the air velocity inside a local duct portion in the proximity to an individual workplace and which control system uses this information to control the operation of the complete ventilation system to maintain a minimum air flow in the local duct arrangements of the ventilation system.

It is to be understood that the sampling frequency, i.e. the time between each pressure measurement may be altered depending on how the ventilation system is used. The sampling frequency may by way of example higher during normal working hours in the building or if certain workplaces requiring a higher air flow are running or not.

According to yet another aspect, the invention refers to an asymmetric bend duct section to be used in a ventilation system, said asymmetric bend duct section comprising:

a straight duct portion connected to a bend duct portion thereby providing the asymmetrical bend duct section with a first opening and a second opening, a first pressure sensor arranged on the outside of the asymmetrical bend duct section and further arranged in fluid communication with the interior of the asymmetrical bend duct section via a first through-going opening arranged in a circumferential wall portion of the straight duct portion; and a second pressure sensor arranged on the outside of the asymmetric bend duct section and further arranged in fluid communication with the interior of the asymmetrical bend duct section via a second through-going opening arranged in the circumferential wall portion of the bend duct portion; wherein said first and second pressure sensors are configured to communicate with a control computer.

Accordingly, an asymmetrical bend duct section is provided that may be handled as an off-the-shelf duct unit with sensors that may be readily mounted in a ventilation system during installation or be retro-fit in an already installed ventilation system. The asymmetrical bend duct section may be arranged in any position between the main duct and the workplace. In a typical ventilation system, the main duct extends along the ceiling and is connected to each workplace via vertical drop ducts which connect to the main duct via bend ducts. The asymmetrical bend duct section may by way of example replace such bend duct. The communication between the pressure sensors and the control computer may be configured to be made via various types of wired field bus industrial protocols or industrial wireless protocols. Accordingly, once the asymmetrical bend duct section is installed, the sensors are ready to communicate with a control computer for the control computer to control the operation and performance of the ventilation system.

The first and the second pressure sensors may be arranged in fluid communication with the interior of the asymmetric bend duct section via a distance member formed by a pipe or flexible tube that extends between the first through-going opening and the first pressure sensor and between the second through-going opening and the second pressure sensor respectively. The first and second pressure sensors may alternatively be arranged by a respective connector directly to the exterior wall portion of the asymmetrical bend duct section. The first and the second through-going openings may be arranged along the inner curvature of the asymmetrical bend duct section, i.e. where the radius R as seen in a virtual plane C in parallel with the longitudinal center line of the asymmetrical bend duct section is the smallest. As given above, in the context of the invention, the term "asymmetrical" should be understood as a bend duct section where the two free ends (arms) of the bend duct section have different longitudinal extensions. In its simplest form, the asymmetrical bend duct section may comprise a bend duct portion having an angle $\alpha$ of 90 degrees with two arms of equal lengths L1 and where one of the arms is connected to or merges with a straight duct portion having a length L2, thereby forming an asymmetrical bend duct section with different arm lengths L1 and L1+L2 respectively. It is to be understood that the bend duct portion as such may form an angle $\alpha$ different to 90 degrees.

The straight portion of the asymmetrical bend duct section ensures a controlled velocity distribution across the cross sectional area of the duct before the air enters the bend. The straight duct portion is preferably at least 2 times the duct diameter but should preferably have a minimum length, L2, of 500 mm.

The asymmetrical bend duct section is preferably formed as a unitary body. It is to be understood that it may also be formed by two or more connected parts. By providing the asymmetrical bend duct section as a unitary body it is ensured that no un-expected obstacles are created between the two pressure measuring points during installation or during the life time of the ventilation system. Any such un-expected obstacles will have a negative impact on the operation of the ventilation system since the control computer is configured to operate and control the ventilation system based on pre-determined values (rules) that are unique for a specific design of the installed asymmetrical bend duct section.

The pressure measuring point arranged at the straight duct portion is preferably arranged in a position corresponding to half of the length L2 of the straight duct portion and at least 100 mm before the inlet of the bend portion, i.e. where the bend radius starts and at least 100 mm from the first opening of the straight duct portion. The first and the second through-going openings may be arranged along the inner curvature of the asymmetrical bend duct section, i.e. where the radius R as seen in a virtual plane C in parallel with the longitudinal center line of the asymmetrical bend duct section is the smallest.

The bend duct portion may have a bend extending along an angle $\alpha$ in view of a first virtual plane A extending through the center of curvature CC of the bend duct portion and perpendicular to a longitudinal center line CL of the asymmetrical bend duct section; and wherein the second through-going opening is arranged in the circumferential wall portion of the bend duct portion along a second virtual plane B extending through the center of curvature CC of the bend duct portion and forming an angle $\beta$ relative to the first virtual plane A, the angle $\beta$ extending in a virtual plane C having an extension in parallel with the longitudinal center line CL, and said angle $\beta$ being within the range of 0-$\frac{2}{3}$ of the angle $\alpha$ and more preferred within the range of 0-$\frac{1}{2}$ of the angle $\alpha$.

Accordingly, the second through-going opening is arranged in or adjacent the downstream end of the bend duct portion of the asymmetric bend duct section. Thereby the second pressure sensor which is arranged to communicate with the interior of the asymmetric bend duct section through the second through-going opening will be able to measure the pressure in the turbulent air flow, which turbulence is the result of the air flow changing flow direction when going from the straight duct portion to and through the duct bend.

According to another aspect, the invention refers to the use of an asymmetrical bend duct section in a ventilation system, said ventilation system comprising a control computer and a main duct connected to at least one motorized fan and further connected to at least one workplace via a local duct arrangement, wherein said local duct arrangement comprises an asymmetrical bend duct section according to any of claims 10-11 and a gate arranged in a position between the workplace and the main duct. The ventilation system and its advantages and also the method of operating the ventilation system have been thoroughly discussed above and to avoid undue repetition, reference is made to the sections above which are equally applicable to the use of the asymmetrical bend duct section.

Further objects and advantages of the present invention will be obvious to a person skilled in the art reading the detailed description given below describing different embodiments.

BRIEF DESCRIPTION OF THE DRAWINGS

The invention will be described in detail with reference to the schematic drawings.

DETAILED DESCRIPTION

Figure 1:
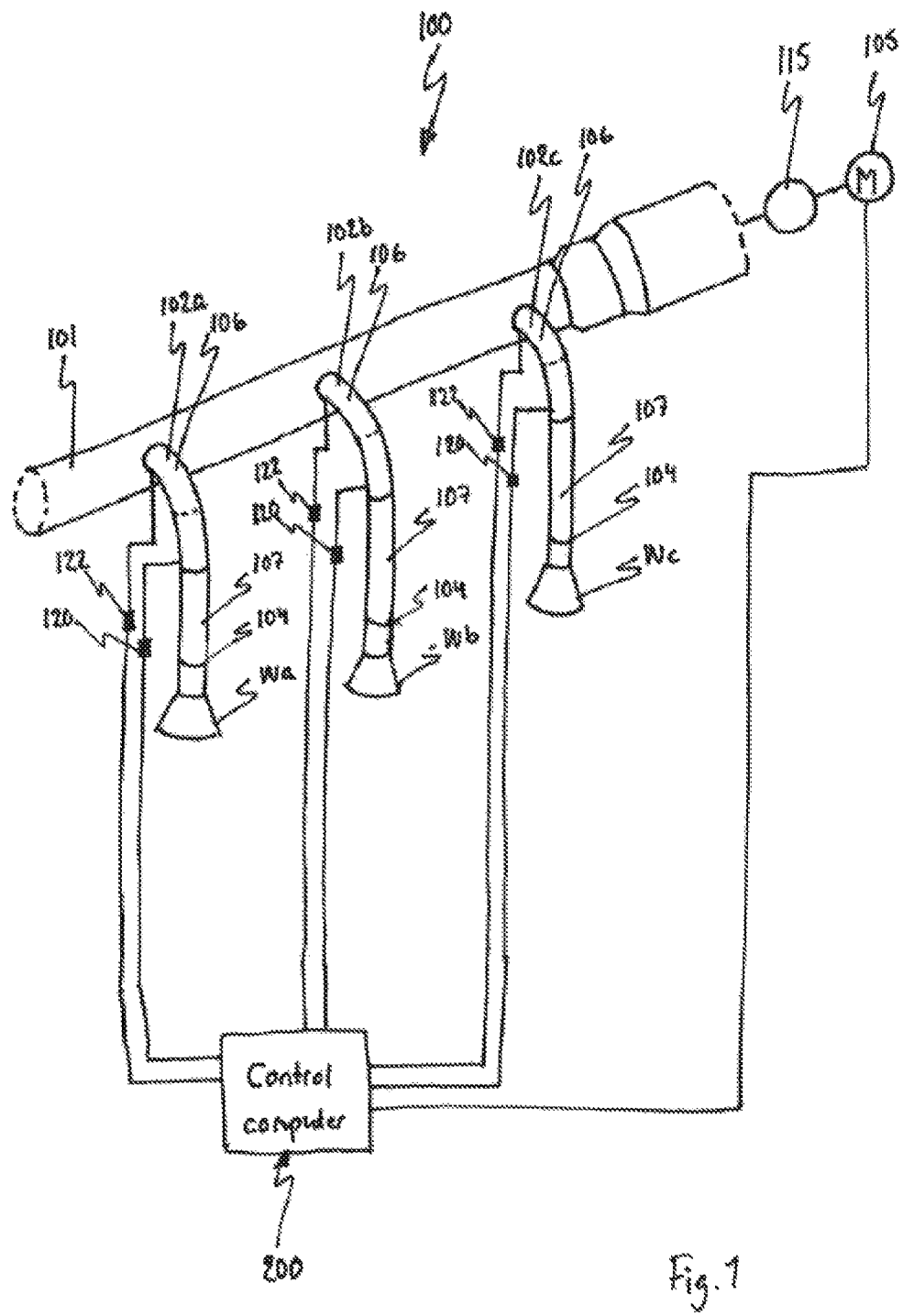
FIG. 1 discloses highly schematically one embodiment of a lay-out of a ventilation system in a production site comprising a plurality of different workplaces.

Now turning to FIG. 1, one embodiment of a lay-out of a ventilation system 100 in a production site comprising a plurality of different workplaces Wa; Wb; Wc is highly schematically disclosed. The ventilation system 100 will be exemplified as an exhaust ventilation system configured to ventilate dust, particulate matter or fumes that are generated at the workplaces Wa; Wb; Wc. It is however to be understood that the same principle is applicable also to an inlet ventilation system.

The ventilation system 100 comprises a main duct 101 from which a plurality of local duct arrangements 102*a*; 102*b*, 102*c* branches-off. The main duct 101 typically extends along the ceiling of a building. The local duct arrangements 102*a*; 102*b*, 102*c* are connected to the main duct 101 and are often referred to as drop-ducts in the art. Each local duct arrangement 102*a*; 102*b*, 102*c* is connected to a workplace Wa; Wb; Wc. The local duct arrangements 102*a*; 102*b*, 102*c* in one and the same ventilation system 100 may have different diameters.

An optional gate 104 may be arranged in the local duct arrangement 102*a*; 102*b*, 102*c* in a position between the workplace Wa; Wb; Wc and the main duct 101.

The workplaces Wa; Wb; Wc may be differently equipped in terms of machinery and hence have specific needs in terms of airflow. By way of example, not all workplaces Wa; Wb; Wc may require the same airflow. Also, the airflow for one and the same workplace Wa; Wb; Wc may differ over time depending on how its related gate (if any) is set and the condition of any filter. It is also to be understood that not all workplaces Wa; Wb; Wc must be in use at the same time.

The ventilation system 100 further comprises at least one motorized fan 105 connected to the main duct 101. The motorized fan 105 is configured to establish an airflow through the main duct 101 and the respective local duct arrangement 102*a*; 102*b*, 102*c*. It is to be understood that the airflow may be directed to provide a suction action from the individual workplaces Wa; Wb, Wc in which case the ventilation system 100 acts as an exhaust ventilation system, alternatively be directed to provide an inlet airflow towards the individual workplaces Wa; Wb, Wc.

The main duct 101 is in the disclosed embodiment provided with a cross section that gradually or step-wise becomes larger and larger towards the motorized fan 105 with the largest cross section adjacent the motorized fan 105.

In the disclosed embodiment, the ventilation system 100 further comprises an optional central filter 115. The central filter 115 is schematically disclosed as being arranged in a position upstream the motorized fan 105. It is to be understood that other positions are possible.

Each local duct arrangement 102*a*; 102*b*, 102*c* comprises an asymmetrical bend duct section 106. The asymmetrical bend section 106 is arranged in a position between the workplace Wa; Wb; Wc and the main duct 101. In the disclosed embodiment, the asymmetrical bend duct sections 106 are arranged in the interface between the main duct 101 and the individual local duct arrangements 102*a*; 102*b*, 102*c*, whereby a drop down duct portion 107 interconnects the asymmetrical bend duct section 106 with the respective workplace Wa; Wb; Wc. The drop down duct portion 107 may be a rigid duct or a flexible duct, or a combination thereof.

Figure 2:
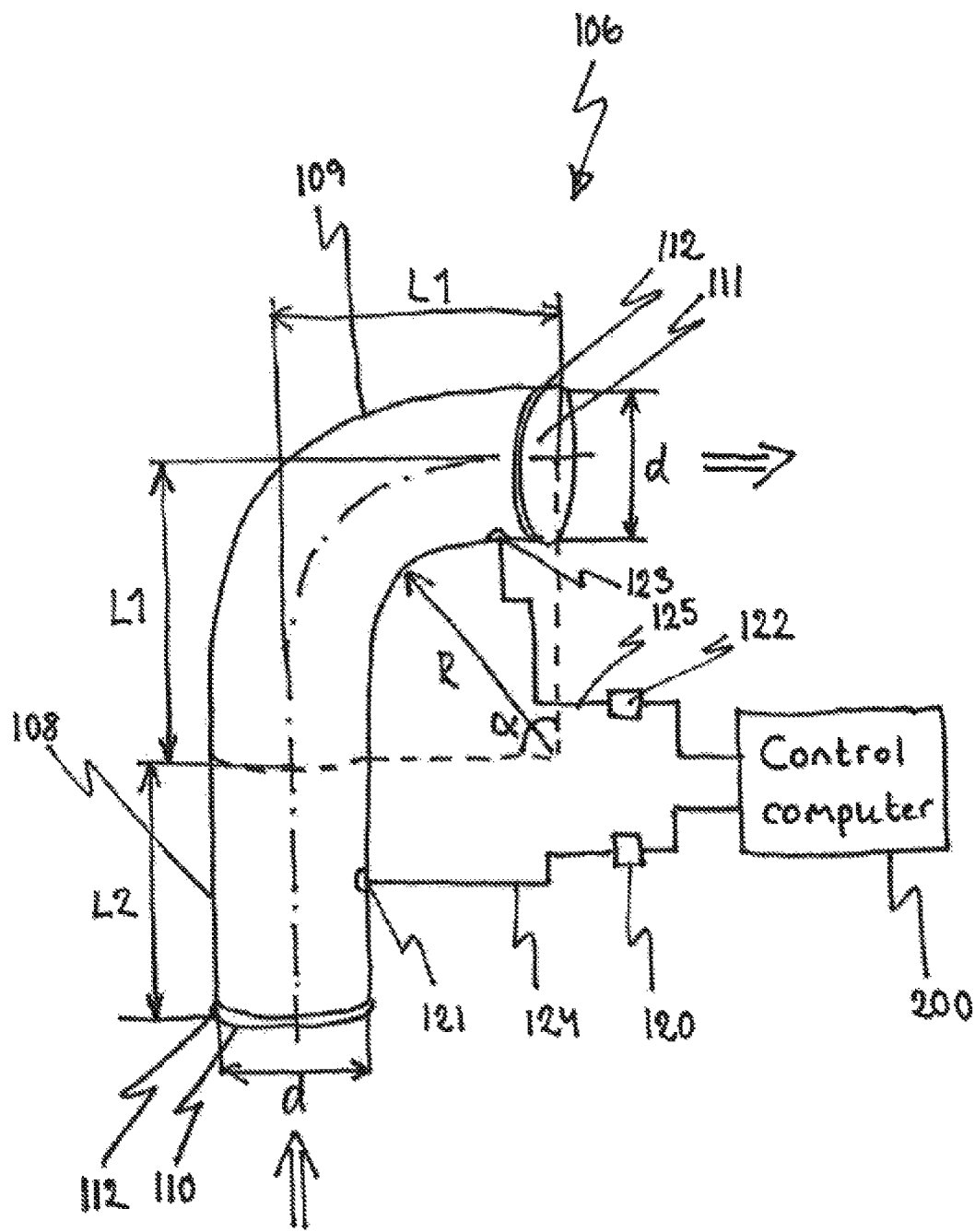
FIG. 2 discloses highly schematically one embodiment of an asymmetrical bend duct section according to the invention.

Now turning specifically to FIG. 2, one embodiment of the asymmetrical bend duct section 106 is disclosed. The asymmetrical bend duct section 106 comprises a straight duct portion 108 connected to or merging with a bend duct portion 109. The asymmetrical bend duct section 106 with the straight duct portion 108 and the bend duct portion 109 comprises two free ends (arms) having different longitudinal extensions L1 and L1+2 respectively to be discussed below.

The asymmetrical bend duct section 106 has a first opening 110 and a second opening 111. The first and the second openings 110, 111 are preferably each provided with a duct connecting arrangement 112, well known in the art allowing the asymmetric bend duct section 106 to be connected to the ventilation system 100. It is preferred that the asymmetrical bend duct section 106 has a uniform diameter d.

The asymmetric bend duct section 106 has a hollow cross section allowing an airflow from the first opening 110 towards the second opening 111, see arrow in FIG. 2. Thus, the first opening 110 forms an inlet and the second opening 111 forms an outlet. In the situation where the ventilation is an exhaust ventilation system, the asymmetric bend duct section 106 is configured to be connected to the main duct 101 via the second opening 111, whereas in the situation where the ventilation is an inlet ventilation system, the asymmetric bend duct section 106 is configured to be connected to the main duct 101 via the first opening 110. The connection of the second opening 111 to the main duct may be made either directly or via a duct section, see FIG. 3.

The bend duct portion 109 is disclosed as comprising a single curved bend with a radius R forming an angle α of 90 degrees. It is to be understood that the single curved bend with remained function may form an angle α different to 90 degrees. Also, it is to be understood that the bend duct portion 109 may have another curvature than a single curve.

The radius R of bend duct portion 109 virtually delimits two arms of equal length L1. The free end of the first arm forms the second opening 111 of the asymmetric bend duct section 106. The end of the second arm is connected to or merges with the straight duct portion 108 having a length L2, thereby providing the asymmetrical bend duct section 106 with arms of different lengths L1 and L1+L2 respectively. The term "connect" in the context of the transition between the straight duct portion 108 and the bend duct portion 109 should be interpreted as a connection that may be formed as a mechanically openable and closeable connector, a welded or soldered joint, or simply two virtual geometrical duct portions merging to form one unitary duct section. Thus, the asymmetrical bend duct section 106 may be formed as a unitary body or be formed by two or more physically connected parts. In FIG. 2, the transition between the straight duct portion 108 and the bend duct portion 109 is illustrated as a dashed line.

The length L2 of the straight duct portion 108 is preferably at least 2 times the duct diameter d but should have a minimum length, L2, of 500 mm. The asymmetrical bend duct section 106, no matter if it is formed as a unitary body or by two or more connected parts may be made by a rigid material to ensure a given cross section through-out its full length. The inner walls are preferably smooth.

A first pressure sensor 120 is arranged on the outside of the asymmetric bend duct section 106 and further arranged in fluid communication with the interior of the asymmetric bend duct section 106 via a first through-going opening 121 arranged in a circumferential wall portion of the straight duct portion 108.

The through-going opening 121 of the first pressure sensor 120 is preferably arranged on a position corresponding to half of the length L2 of the straight duct portion 108 and at least 100 mm before the transition inlet to the bend portion, i.e. where the bend radius starts and at least 100 mm from the first opening 110 of the straight duct portion 108.

A second pressure sensor 122 is arranged on the outside of the asymmetric bend duct section 106 and further arranged in fluid communication with the interior of the asymmetric bend duct section 106 via a second through-going opening 123 arranged in the circumferential wall portion of the bend duct portion 109. Alternatively, as will be described below the second through-going opening 123' may be arranged in a duct section 300 connecting the second opening 111 of the bend duct portion 109 to the ventilation system 100.

Figure 3:
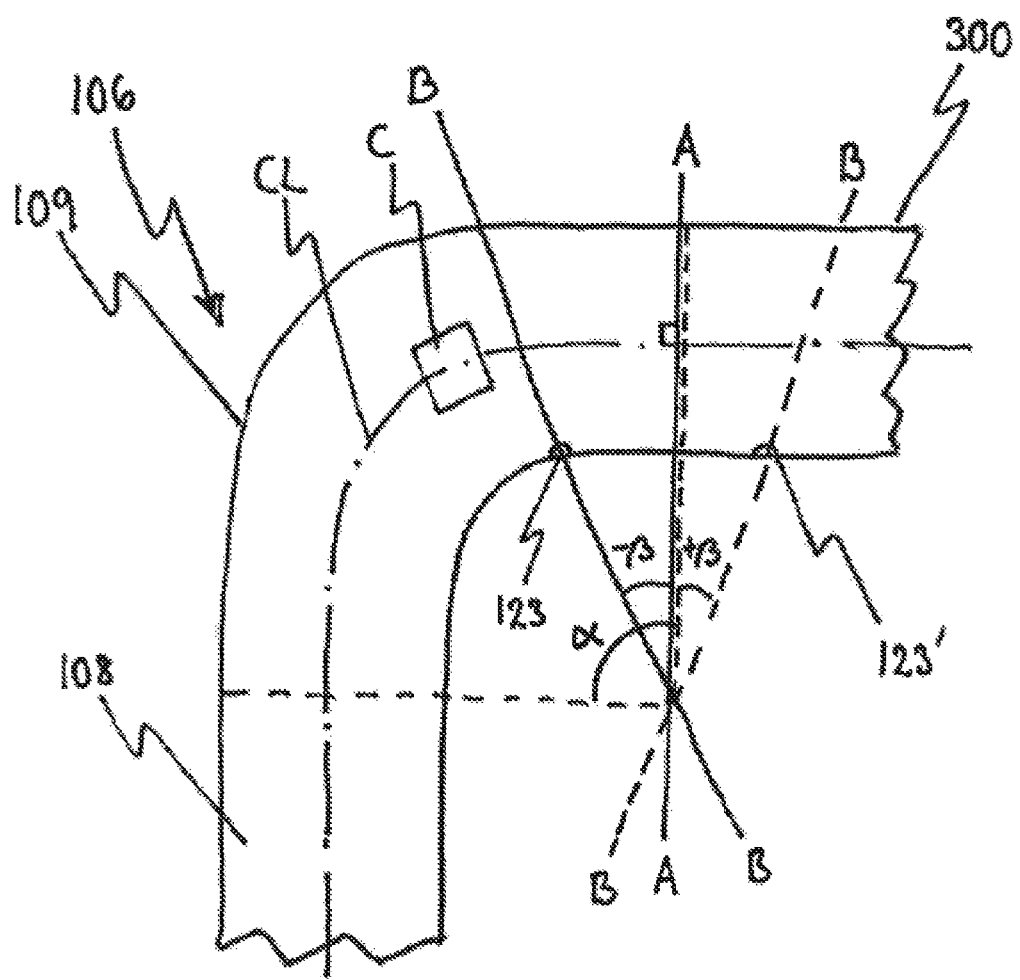
FIG. 3 discloses highly schematically the position of the second through-going opening.

Now turning specifically to FIG. 3, the position of the second through-going opening 123 will be described. FIG. 3 discloses the bend duct portion 109 and a portion of the straight duct portion 108 and also a portion of a duct section 300 connected to the second opening 111 formed by the bend duct portion 109.

In the disclosed embodiment, the bend of the bend duct portion 109 extends along an angle α in view of a first virtual plane A extending through the center of curvature CC of the bend duct portion 109 and perpendicular to a longitudinal center line CL of the asymmetrical bend duct section 106. The second through-going opening 123 is arranged in the circumferential wall portion of the bend duct portion 109. The second through-going opening 123 is arranged along a second virtual plane B that extends through the center of curvature CC of the bend duct portion 109. The second virtual plane B forms an angle β relative to the first virtual plane A. The angle β extends in a virtual plane C having an extension in parallel with the longitudinal center line CL. The angle β is within the range of 0-⅔ of the angle α and more preferred within the range of 0-½ of the angle α.

As is also disclosed in FIG. 3, the second through-going opening 123 must not be arranged in the bend duct portion 109 of the asymmetric bend duct section 106. In a situation when the asymmetric bend duct section 106 is mounted in a ventilation system, the bend duct portion 109 may be connected to a duct section 300. The second through-going opening 123' may in that case be arranged in that duct section 300 instead. Accordingly, in a situation when the asymmetric bend duct section 106 is mounted in a ventilation system the angle β may be within the range of +/−⅔ of the angle α and more preferred within the range of +/−½ of the angle α. As is clear from FIG. 3, a negative range (−β) corresponds to a position in the bend duct portion 109, whereas a positive range (+β) corresponds to a position in the duct section 300 connected to the bend duct portion 109.

No matter position of the second through-going opening 123, 123', the second pressure sensor 122 which is arranged to communicate with the interior of the asymmetric bend duct section 106 through the second through-going opening 123, 123' will be able to measure the pressure in the turbulent air flow, which turbulence is the result of the air flow changing flow direction when going from the straight duct portion 108 to and through/past the duct bend portion 109.

No turning to FIG. 2 anew. The first and the second pressure sensors 120; 122 are arranged in fluid communication with the interior of the asymmetric bend duct section 106 via a respective connector tube 124; 125 that extends between the first through-going opening 121 and the first pressure sensor 120 and between the second through-going opening 123 and the second pressure sensor 122 respectively. Thereby the first and the pressure sensors 120; 122 are arranged on a distance from the exterior wall of the asymmetric bend duct section 106. The first and second pressure sensors 120; 122 are arranged to communicate with a control computer 200. The communication between the pressure sensors 120; 122 and the control computer 200 may be made via various types of wired field bus industrial protocols or industrial wireless protocols. The connector tubes may be flexible or rigid. It is to be understood that the same principle is applicable if the second through-going opening 123' is not arranged in the asymmetric bend duct section 106 but instead in the duct section 300 connected thereto.

The connector tubes may be omitted and the first and second pressure sensors 120; 122 be arranged on the exterior wall portion of the asymmetric bend duct portion 106 by being directly connected thereto via connectors.

By the first and second pressure sensors 120; 122 being in fluid communication with the interior of the asymmetric bend duct section 106, the sensors 120; 122 may sense a pressure in an environment in which the same pressure prevails as in the interior of the asymmetric bend duct section 106.

The first and the second through-going openings 121; 123 are preferably arranged along the inner curvature of the asymmetrical bend duct section 106, i.e. where the radius R as seen in a virtual plane C in parallel with the longitudinal center line of the asymmetrical bend duct section 106 is the smallest. The risk of dust reaching the pressure sensors 120; 122 via the through-going openings 121; 123; 123' is thereby minimized since the dust that is transported through the asymmetrical bend duct section 106 will strive to follow the opposite wall portion having the largest radius due to centrifugal forces.

The asymmetrical bend duct section 106 may be provided as an off-the-shelf duct unit that easily may be mounted in a ventilation system 100 during installation or be retro-fit in an already installed ventilation system. The asymmetrical bend duct section 106 may be arranged in any position between the main duct 101 and the workplace Wa; Wb; Wc.

Now turning to FIG. 1 anew, the first and second pressure sensors 120; 122 are configured to communicate with a control computer 200. The communication between the pressure sensors 120; 122 and the control computer 200 may be made via various types of wired field bus industrial protocols or industrial wireless protocols.

The control computer 200 is further configured to communicate with the motorized fan 105 to control the speed of the motorized fan and hence the airflow in the ventilation system 100 based on signals from the pressure sensors 120; 122. The motorized fan 105 may be controlled by a non-disclosed variable frequency drive.

The control computer 200 may further be configured to control opening and closing of the gates 104 in the local duct arrangements 102a; 102b; 102c. The operation of the gates 104 may be determined based on signals received from work activity sensors (not disclosed) adjacent the workplaces Wa; Wb; Wc and/or based on signals from sensors (not disclosed) in the main duct 101 relating to air velocity in the main duct 101. The gates 104 may be operable between a fully open, a partially open or a fully closed position. By way of example, if it is determined that that an individual workplace Wa; Wb; Wc is temporarily not in use or even out of order, the gate 104 in the related local duct arrangement 102a; 102b; 120c may be closed in order to avoid undue leakage of heat from the building. Thereby energy savings of the building may be provided for. Further, the control computer 200 is configured to strive to optimize the air velocities to meet minimum acceptable velocities while still not being excessively too high. If it by way of example is determined, in a situation where only the gate 104 in the local duct arrangement 102c is open or partially open, that the velocity in the main duct 101 is below the minimum required velocity in the part of the main duct 101 that extends between the local duct arrangement 102c and the central filter 115, the gates 104 arranged in the local duct arrangements 102a and/or 102b farther away may be forced open or partially open by the control computer 200 until the air velocity in the main duct 101 as seen in the portion between the local duct arrangement 102c and the central filter 115, has reached a minimum required velocity or a velocity above the same.

It is to be understood that one and the same control computer 200 may be arranged to control the full ventilation system 100, or alternatively that two or more control computers may be used.

It is to be understood that the ventilation system 100 further may comprise other types of sensors (not disclosed), such as filter pressure sensors, fan pressure sensors and also equipment such as duct collectors etc. The type, position and operation of such sensors and equipment are obvious to the skilled person in the art.

When designing the ventilation system 100, the control computer 200 is provided with information regarding diameters of the local duct arrangements 102a; 102b; 102c and the diameters d of the asymmetric bend duct sections 106 to be mounted. The diameter of the local duct arrangement 102a; 102b; 102c and its related asymmetric bend duct section 106 is preferably the same.

Figure 4:
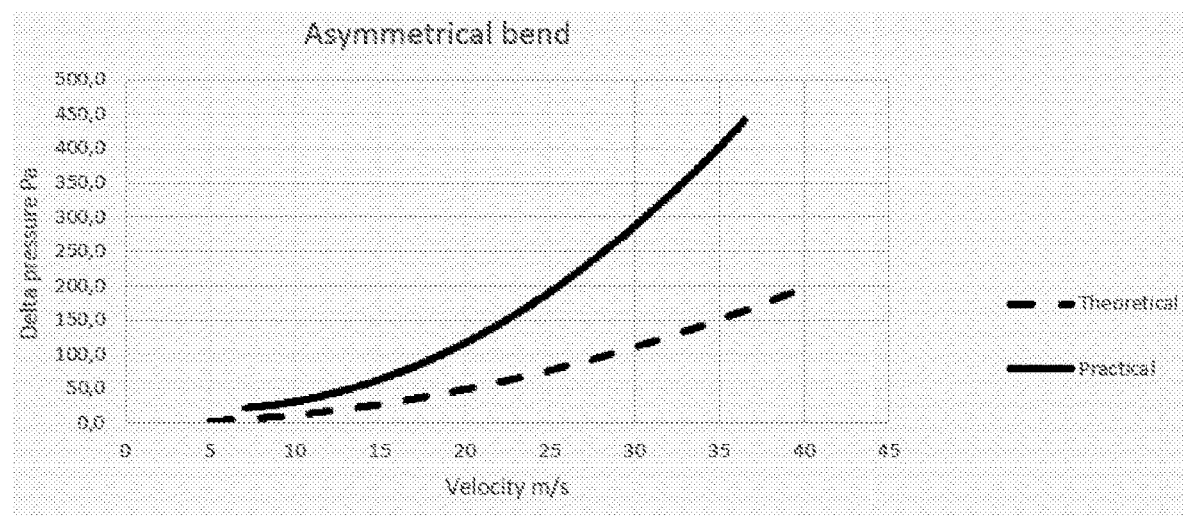
FIG. 4 is a diagram with the air velocity versus the pressure difference for an asymmetrical bend duct section according to the invention.

The control computer 200 is pre-programmed with rules (protocols) allowing the control computer 200, based on determined pressure difference in a local duct arrangement 102a; 102b; 102c, to determine the present (prevailing) air velocity in the same local duct arrangement. This calculation is made based on pre-hand physical measurements for an asymmetrical bend duct section 106 having the same dimensions. One such example is given in FIG. 4 disclosing a graph with theoretically calculated values and physical measurements. The values are given for a 90-degree asymmetrical bend duct section having a diameter of 160 mm. The graph discloses the velocity range of 0-40 m/s although the range of most interest to industrial ventilation systems is 10 m/s up to 35 m/s.

As can be seen from this graph there is a difference between the theoretically calculated relationship between pressure difference and air velocity and the physically measured relationship. The physically measured relationship which takes actual turbulence effects into account discloses an exponentially faster growing relationship than the theoretically calculated (broken line) that does not take any turbulence effects into account. The control computer 200 is configured to use the physically measured relationship as a basis for regulation. This will provide a higher quality in the control of the ventilation system than if the differential pressure measuring was made on a similar duct length where turbulence effects are not present.

The control computer 200 is further provided with information relating to pre-determined acceptable air velocity of the related workplace Wa; Wb; Wc. The pre-determined acceptable air velocity is typically prescribed by guidelines or government regulations and in some cases by contracts with the customer. Accordingly, the pre-determined acceptable air velocity for each local duct arrangement 102a; 102b; 102c is a known value and may be handled as a pre-programmed rule (protocol) by the control computer 200.

Figure 5:
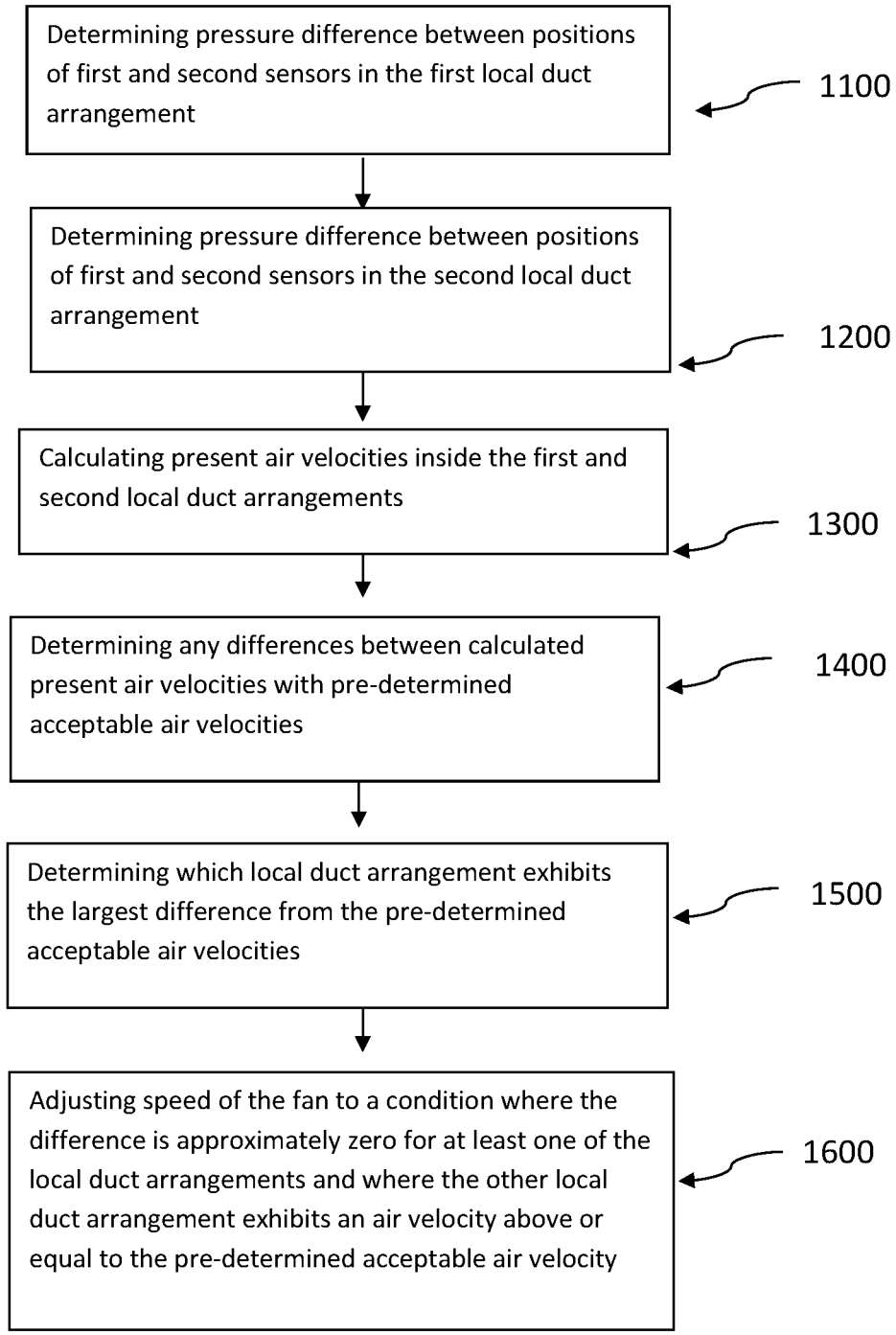
FIG. 5 discloses a flow chart representing the method of operating the ventilation system.

In the following the operation and the control of the ventilation system 100 described above will be described with reference to FIG. 5.

The operation will be described based on a ventilation system 100 comprising two workplaces Wa; Wb and hence two local duct arrangements 102a; 102b. The operation is equally applicable in the event the ventilation system 100 should contain only one or more than two workplaces.

When the ventilation system 100 is installed and started, the control computer 200 will directly initiate to sample and process pressure information received from the first and second pressure sensors 102; 122 in each asymmetric bend duct section 106.

During operation, the control computer determines, step 1100, based on input signals from the first and second pressure sensors 120; 122, the pressure difference between the positions of the first and second pressure sensors 120; 122 in the first local duct arrangement 102a.

The control computer further determines, step 1200, based on input signals from the first and second pressure sensors 120; 122, the pressure difference between the positions of the first and second pressure sensors 120; 122 in the second local duct arrangement 102b.

In step 1300, the control computer 200 calculates the present air velocities inside the first and the second local duct arrangements 102a; 102b based on the determined pressure differences of the first and the second local duct arrangements 102a; 102b. As given above, the calculation may be made based on pre-hand information regarding the relationship between velocity and pressure difference for an asymmetric bend duct section 106 of the corresponding diameter. As given above, the pre-hand information will rely on a physically measured relationship between pressure difference and air velocity which takes the actual turbulence effect into account. This provides a higher quality in the regulation of the ventilation system than if a pressure difference between positions without turbulence effects was used by the control computer 200 as a basis for the regulation.

In step 1400, the control computer 200 determines any differences between the calculated present air velocities inside the first and the second local duct arrangements 102*a*; 102*b* with pre-determined acceptable air velocities for each of the first and second local duct arrangements 102*a*; 102*b*. The pre-determined acceptable air velocities for each local duct arrangement 102*a*; 102*b* has during configuration of the control computer 200 been provided as pre-programmed rules. The pre-determined values have been compiled from guidelines or government regulations and in some cases by contracts with the customer prescribing acceptable air velocities in the respective local duct arrangements. The acceptable values may by way of example depend on the type of work to be performed in the workplace. Grinding work generating large volumes of dust or welding generating fumes may by way of example require higher air flows than an adjacent workplace involving e.g. assembling work.

Provided a difference is determined, the control computer 200 determines, step 1500, which local duct arrangement 102*a*; 102*b* exhibits the calculated present air velocity that differs the most from the pre-determined acceptable air velocity.

The control computer 200 is then, based on this information configured to instruct an adjustment, step 1600, of the speed of the motorized fan 105 to a condition where the difference is approximately zero for at least one of the local duct arrangements 102*a*; 102*b* and where the other local duct arrangement(s) exhibits an air velocity above or equal to the pre-determined acceptable air velocity.

Accordingly, the method uses an on-demand closed loop regulation which constantly strives to meet the airflow requirements for each local duct arrangement 102*a*; 102*b*; 102*c* with its respective workplace Wa; Wb; Wc. The control system automatically provides numerous sampling of measurements that are used to determine and control the air velocity inside a local duct portion in the proximity to an individual workplace and the control system uses this information to control the operation of the complete ventilation system to thereby maintain a minimum air flow in the local duct arrangements of the ventilation system.

Since the control computer 200 operates based on set rules regarding pre-determined acceptable air velocities for each local duct arrangement 102*a*; 102*b*; 102*c* and uses this information as a basis in its closed-loop operation, the ventilation system will tune itself directly from start. This greatly simplifies the otherwise complex and time consuming commissioning of the ventilation system during installation, i.e. the process by which an equipment, facility or plant is tested to verify if it functions according to its design objectives or specifications. This also means that separate pressure measurements using temporary probes inside the ducts are no longer required during commissioning. This simplifies the commissioning and removes error possibilities.

Further, in the event any component in the process machinery or in the ventilation system should be removed, replaced or up-dated or even start to mal-function during the life time of the ventilation system, the control system will automatically detect any impact thereto to the pressure/velocity in the local duct system. The control computer will, if determined to be necessary in view of predetermined allowable air velocities, automatically adjust the operation of the ventilation system as a whole. This also applies if any filter should clog or if a duct starts to leak.

The control computer has been described as primarily handling signals from the pressure sensors. However, the control computer may also be configured to receive, process and act based on supplementary signals from other sensors, such as activity sensors, gate sensors, filter pressure sensors, fan pressure sensors and also equipment such as dust collectors etc.

Although the invention has been described as being based on the relationship between pressure and air velocity, it is to be understood that the same principle is directly applicable also the relationship between pressure and air volume, where the air volume is achieved by a simple conversion using the formula $U=A*V$, where U is the air volume, A is the area of the duct and V is the air velocity. In some industries, such as the pharmaceutical industry, design values are typically specified in air volumes per time unit rather than air velocities.

The invention claimed is:

1. A ventilation system, the ventilation system comprising a main duct connected to at least one motorized fan rotatable at a selectable rotation speed, and further connected to at least one workplace via a local duct arrangement, a gate arranged in a position between the workplace and the main duct and a control computer, wherein said local duct arrangement comprises an asymmetrical bend duct section having a straight duct portion connected to a bend duct portion that together define an inner curvature of the asymmetrical bend duct section, said asymmetrical bend duct section being defined by a circumferential wall portion delimiting an interior of the asymmetrical bend duct section and forming a first duct opening facing the workplace and a second duct opening facing the main duct, said ventilation system further comprising a first pressure sensor arranged exteriorly of the asymmetrical bend duct section and in fluid communication with the interior of the asymmetrical bend duct section via a first through-going opening arranged at a first position in the circumferential wall portion of the straight duct portion, and a second pressure sensor arranged exteriorly of the asymmetrical bend duct section and in fluid communication with the interior of the asymmetrical bend duct section via a second through-going opening arranged at a second position in the circumferential wall portion of the bend duct portion or in a duct section connected to the bend duct portion, wherein said first and second positions are arranged along the inner curvature of the asymmetrical bend duct section, wherein said first and second pressure sensors are configured to communicate with the control computer, wherein said control computer is configured to determine, based on input signals from the first and second pressure sensors, a pressure difference between the first and second positions of the through-going openings of the first and second pressure sensors, said pressure difference attributable at least in part to turbulence induced by said asymmetrical bend duct section, and wherein said control computer is further configured to control the rotation speed of the motorized fan based on the determined pressure difference.

2. The ventilation system according to claim 1, wherein the asymmetrical bend duct section has a longitudinal center line extending therethrough, and wherein the bend duct portion has a bend extending along an angle α in view of a first virtual plane extending through a center of curvature of the bend duct portion and orthogonal to the longitudinal center line; and wherein the second through-going opening is arranged in the circumferential wall portion of the bend duct portion or in the duct section connected to the bend duct portion in a second virtual plane extending through the center of curvature of the bend duct portion and forming an angle θ relative to the first virtual plane, the angle θ extending in a virtual plane in parallel with the longitudinal center line, and wherein the angle θ is within a range of +/−2/3 of the angle α.

3. The ventilation system according to claim 1, wherein the control computer is configured to calculate air velocity inside the local duct arrangement based on the determined pressure difference; compare the calculated air velocity with a pre-determined acceptable air velocity inside the local duct arrangement; and if the calculated air velocity is determined to differ from the pre-determined acceptable air velocity, adjust the speed of the motorized fan.

4. The ventilation system according to claim 3, comprising at least two workplaces with related local duct arrangements, and wherein the control computer is configured to determine which local duct arrangement exhibits a calculated air velocity that differs the most from the pre-determined acceptable air velocity by a first difference, and to adjust the speed of the motorized fan to a condition where the first difference is approximately zero for at least one of the local duct arrangements and where the other local duct arrangement(s) exhibits an air velocity above or equal to the pre-determined acceptable air velocity.

5. The ventilation system according to claim 1, wherein the control computer is further configured to control opening and closing of the gate.

6. The ventilation system according to claim 1, wherein the first and second pressure sensors are arranged in fluid communication with the interior of the asymmetrical bend duct section via connectors or distance members.

7. The ventilation system according to claim 1, wherein the system comprises at least two local duct arrangements, each connecting a respective workplace to the main duct, and wherein the at least two local duct arrangements comprises asymmetrical bend duct sections having different diameters.

8. The ventilation system according to claim 2, wherein the angle β is within a range of +/−1/2 of the angle α.

9. A method of operating a ventilation system, said ventilation system comprising at least a first and a second workplace with related local duct arrangements, the method comprising: providing the ventilation system according to claim 1; and by using the control computer, the acts of:
 determining, based on input signals from the first and second pressure sensors, the pressure difference between the positions of the through-going openings of the first and second pressure sensors in the first local duct arrangement;
 determining based on input signals from the first and second pressure sensors, the pressure difference between the positions of the through-going openings of the first and second pressure sensors in the second local duct arrangement;
 calculating the present air velocities inside the first and the second local duct arrangements based on the determined pressure differences;
 determining any differences between the calculated present air velocities inside the first and the second local duct arrangements with pre-determined acceptable air velocities for each of the first and second local duct arrangements; and if a difference is determined:
 determining which local duct arrangement exhibits the calculated present air velocity that differs the most from the pre-determined acceptable air velocity; and
 adjusting the speed of the motorized fan to a condition where the difference is approximately zero for at least one of the local duct arrangements and where the other local duct arrangement(s) exhibits an air velocity above or equal to the pre-determined acceptable air velocity.

* * * * *

UNITED STATES PATENT AND TRADEMARK OFFICE
CERTIFICATE OF CORRECTION

PATENT NO. : 11,179,755 B2
APPLICATION NO. : 16/280355
DATED : November 23, 2021
INVENTOR(S) : Klaus Bihlet It is certified that error appears in the above-identified patent and that said Letters Patent is hereby corrected as shown below:

In the Claims

Claim 2, Column 17, Lines 15-18 change as follows:
angle β relative to the first virtual plane, the angle β
extending in a virtual plane in parallel with the longitudinal
center line, and wherein the angle β is within a range of Signed and Sealed this
Thirty-first Day of May, 2022

Katherine Kelly Vidal
*Director of the United States Patent and Trademark Office*